(12) United States Patent
Ramaswami et al.

(10) Patent No.: US 10,021,320 B2
(45) Date of Patent: Jul. 10, 2018

(54) ELECTRONICALLY CONTROLLED GRADUATED DENSITY FILTERS IN STACKED IMAGE SENSORS

(71) Applicant: Foveon, Inc., San Jose, CA (US)

(72) Inventors: Shrinath Ramaswami, San Jose, CA (US); Glenn J. Keller, West Chester, PA (US)

(73) Assignee: Foveon, Inc., San Jose, CA (US)

( * ) Notice: Subject to any disclaimer, the term of this patent is extended or adjusted under 35 U.S.C. 154(b) by 0 days.

(21) Appl. No.: 15/195,344

(22) Filed: Jun. 28, 2016

(65) Prior Publication Data

US 2017/0374302 A1 Dec. 28, 2017

(51) Int. Cl.
*H04N 5/225* (2006.01)
*H04N 5/355* (2011.01)
*H04N 5/353* (2011.01)
*H04N 5/235* (2006.01)

(52) U.S. Cl.
CPC ....... *H04N 5/35509* (2013.01); *H04N 5/2353* (2013.01); *H04N 5/3532* (2013.01)

(58) Field of Classification Search
CPC ........ G03B 7/18; G02B 26/023; G02B 5/205; H04N 5/238
USPC .......................................... 359/888; 396/241
See application file for complete search history.

(56) References Cited

U.S. PATENT DOCUMENTS

| | | | |
|---|---|---|---|
| 7,635,833 B2 | 12/2009 | Mansoorian | |
| 8,780,241 B2 | 7/2014 | Johnson | |
| 2001/0020676 A1* | 9/2001 | Nakaya | G03F 7/2055 250/234 |
| 2007/0116453 A1* | 5/2007 | Uchiyama | G03B 7/093 396/246 |
| 2007/0242141 A1* | 10/2007 | Ciurea | G02B 5/205 348/239 |
| 2007/0248349 A1* | 10/2007 | Nanjo | G02B 26/02 396/241 |
| 2011/0063483 A1* | 3/2011 | Rossi | H04N 5/3454 348/294 |
| 2012/0188415 A1* | 7/2012 | Johnson | H04N 5/3532 348/241 |
| 2013/0001404 A1* | 1/2013 | Meynants | H01L 27/14609 250/208.1 |

* cited by examiner

*Primary Examiner* — Twyler Lamb Haskins
*Assistant Examiner* — Dwight Alex C Tejano
(74) *Attorney, Agent, or Firm* — Glass & Associates; Kenneth Glass; Kenneth D'Alessandro (57) ABSTRACT

In a digital camera having an imaging array including a plurality of pixels arranged in rows and columns, the digital camera having a mechanical shutter, a method for performing neutral density filtering of images captured by the imaging array, the method comprising opening the mechanical shutter, operating each row in the array by resetting all of the pixel sensors in the row, starting exposure for all of the pixel sensors in the row, closing the mechanical shutter, reading pixel values from the pixels in the array after the mechanical shutter has closed at a time unrelated to a time at which any pixel-select signal was de-asserted, and wherein the interval of time between starting exposure for all of the pixel sensors in the row and closing the mechanical shutter for each row a function of a neutral density filter function applied to an image to be captured.

12 Claims, 8 Drawing Sheets

$t_1$ = Red integration time
$t_2$ = Green integration time
$t_3$ = Blue integration time

ELECTRONICALLY CONTROLLED GRADUATED DENSITY FILTERS IN STACKED IMAGE SENSORS

BACKGROUND

1. Field of the Invention

The present invention relates to digital imaging techniques and to digital image capture techniques. More particularly, the present invention relates to electronic density filters and more particularly to independent color channel graduated density filter techniques in digital cameras.

2. The Prior Art

In landscape photography, the dynamic range in the scene often exceeds the capability of image sensors in digital cameras. This is often because the upper portion of the frame includes the sky, which is substantially brighter than the remainder of the subject matter in the frame. This problem also exists with print film.

Figure 1:
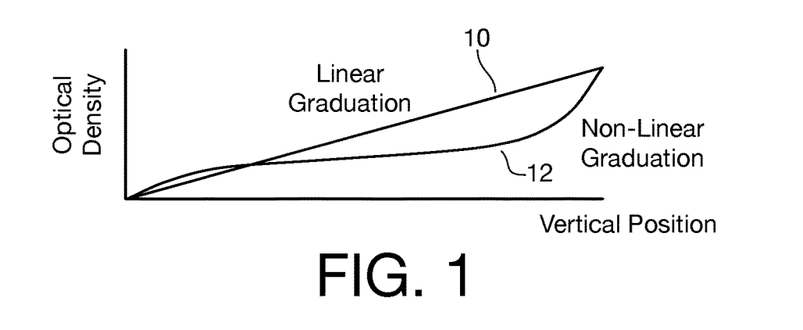
FIG. 1 is a graph illustrating the optical density of both linear and non-linear graduated neutral density filters as a function of vertical position in an image frame.

It is very common therefore to use an optical neutral density filter to compress the dynamic range of a scene to be within the dynamic range of the image sensor. As illustrated in FIG. 1, the density of the filter is graduated and increases from the bottom of the image to the top of the image.

The optical neutral density filter is placed in front of the lens, and is oriented such that the portion of the filter having the highest density is located at the top of the frame so that the image is darkened relative to the bottom. While the density change from the top of the image to the bottom of the image can be linear as shown at reference numeral 10, it is most often non-linear as shown at reference numeral 12.

It is known that an optical neutral density filter can be electronically simulated by placing a variable charge sharing capacitance in parallel with individual pixel sensors in an image sensor or by using a variable capacitance to share the sensed charge of one or more pixel sensor photodiodes during readout. An example of such an electronic neutral density filter for an image sensor is disclosed in U.S. Pat. No. 7,635,833 to Mansoorian. In operation, each photodiode is reset by turning on the appropriate transfer gates, such as 310, at the same time as the reset transistor 325. The photodiode is then allowed to integrate charge.

Because the accumulated photocharge in each pixel sensor is shared between the photodiode and the added capacitor, the pixel sensor operates as though the photodiode received fewer illumination photons by an amount proportional to the value of the capacitor. As the capacitance increases, the size of the photodiode effectively increases, and the sensitivity of the photodiode to incoming illumination decreases.

It is also known to provide an electronic neutral density filter by introducing a controlled delay between the reset signal and the read signal of a digital imaging array. Such a configuration is disclosed in U.S. Pat. No. 8,780,241 to Johnson.

BRIEF DESCRIPTION

According to one aspect of the present invention, an electronic neutral density filter is implemented in a digital camera using a mechanical shutter and having an imaging array including a plurality of pixel sensors that each include a photodiode coupled to a floating node by a pixel select transistor, a reset transistor coupled to the floating node, and a readout transistor coupled between the floating node and a column line by a row-select transistor. A method for performing neutral density filtering includes opening the mechanical shutter, turning on all of the reset transistors, for each row in the array, turning on all of the pixel select transistors, simultaneously turning off all of the pixel select transistors after an interval of time has expired after turning on all of the pixel select transistors, turning off the reset transistors in the array after the interval of time has expired, closing the mechanical shutter, wherein the interval of time for successive rows decreases as a monotonic function. The accumulated photocharge may then be read from the pixel sensors at a time after but otherwise unrelated to the resetting of the pixel sensors.

According to another aspect of the present invention, an electronic neutral density filter is implemented in a digital camera using a mechanical shutter and having an imaging array including a plurality of pixel sensors that each include a photodiode coupled to a floating node by a pixel select transistor, a reset transistor coupled to the floating node, and a readout transistor coupled between the floating node and a column line by a row-select transistor. A method for performing neutral density filtering includes opening the mechanical shutter, turning on all of the reset transistors, for each row in the array, turning on all of the pixel select transistors, simultaneously turning off all of the pixel select transistors after an interval of time has expired after turning on all of the pixel select transistors, turning off the reset transistors in the array after the interval of time has expired, closing the mechanical shutter, wherein the interval of time for successive rows is a non-monotonic function. The accumulated photocharge may then be read from the pixel sensors at a time after but otherwise unrelated to the resetting of the pixel sensors.

According to another aspect of the present invention, a color electronic neutral density filter is implemented in a digital camera using a mechanical shutter and having an imaging array including a plurality of pixel sensors for different colors that each include a photodiode coupled to a floating node by a pixel select transistor, a reset transistor coupled to the floating node, and a readout transistor coupled between the floating node and a column line by a row-select transistor. A method is disclosed for performing neutral density filtering independently for each of the colors includes opening the mechanical shutter, turning on all of the reset transistors, for each row in the array, turning on all of the pixel select transistors, simultaneously turning off all of the pixel select transistors for each selected color separately after an interval of time has expired after turning on all of the pixel select transistors for each color, turning off the reset transistors in the array after the interval of time has expired, closing the mechanical shutter, wherein the interval of time for successive rows decreases as a monotonic function. The accumulated photocharge may then be read from the pixel sensors for each selected color at a time after but otherwise unrelated to the resetting of the pixel sensors.

The color electronic neutral density filter of the present invention is particularly suited for imaging arrays having vertical color pixel sensors such as those manufactured by Foveon, Inc., the assignee of the present invention, although the present invention is suitable for use in other color imager schemes, such as those employing Bayer pattern sensors.

DETAILED DESCRIPTION

Persons of ordinary skill in the art will realize that the following description of the present invention is illustrative only and not in any way limiting. Other embodiments of the invention will readily suggest themselves to such skilled persons.

Figure 2:
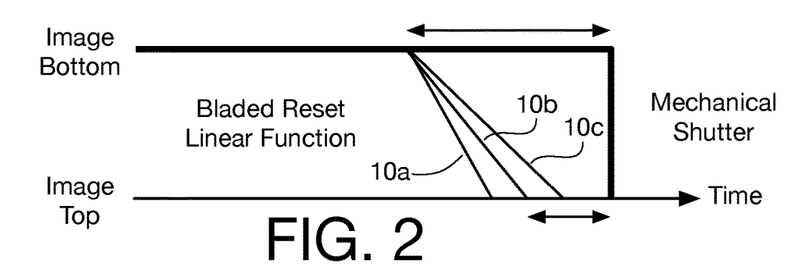
FIG. 2 is a graph illustrating the density of a linear function graduated optical density filter implemented using bladed reset in a digital camera as a function of vertical position in an image frame.
Figure 3:
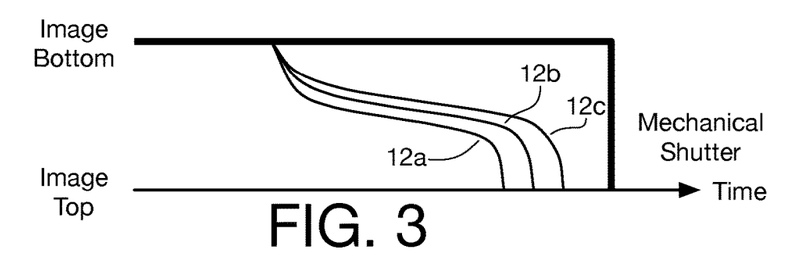
FIG. 3 is a graph illustrating the density of a non-linear graduated neutral density filter as a function of vertical position in an image frame.

An electronically variable graduated neutral density filter according to the present invention by controlling the timing of the end of the reset pulse with the closing of a mechanical shutter in the camera. This technique, shown in FIGS. 2 and 3, illustrating optical filter density as a function of vertical position in the frame may employ either linear attenuation (FIG. 2) or may be non-linear (FIG. 3), for example emulating the non-linear density curve of an optical neutral density filter. Traces 12a, 12b, and 12c in FIG. 2 show varying degrees of linear attenuation, and traces 12d, 12e, and 12f in FIG. 3 show varying degrees of non-linear attenuation.

By applying a non-linear function to a rolling reset (a reset applied sequentially one row at a time to an imaging array) or a bladed reset in the image sensor in a digital camera, any non-linear density curve can be realized. A "bladed reset" is a form of rolling reset where a group of adjacent rows are simultaneously reset. This group is referred to as a blade. In an image sensor employing bladed reset, the entire imaging array is reset by resetting the blades one at a time. This is faster than resetting the individual rows one at a time using a rolling reset, and is slower than global reset, where all the rows are reset at one time.

One advantage of a rolling reset and a bladed reset over a global reset is that the artifacts are smaller. The advantage of a bladed reset over a single row rolling reset is the speed is faster. Either a rolling reset or bladed reset can be used for the neutral density filter of the present invention. Using the bladed reset method, a trade off is made between a larger blade (faster, but larger artifacts) and a smaller one (slower, smaller artifacts). Typical blade sizes for use in the neutral density filter of the present invention are 1, 2, 4, 8, 16, 32 rows, but persons of ordinary skill in the art will readily understand that other blade sizes may be used depending on the vertical granularity of the filter artifacts that can be tolerated.

Figure 4:
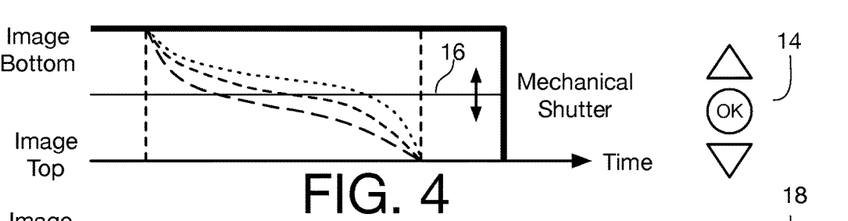
FIG. 4 is a graph illustrating exemplary control of the 50% point of a graduated optical density filter in accordance with the present invention.

Since the location of the "horizon" that defines the boundary between darker foreground & brighter background is a function of the orientation of the camera in the hands of the user and is not fixed, it is useful to allow a user to adjust the vertical position of the filter in addition to its "strength". This can be done using the 4-way controller buttons located on the back of most digital cameras. As non-limiting examples, the position of the 50% attenuation of the electronic filter can be adjusted by using the "up" and "down" buttons 14 on the back of the camera as illustrated in FIG. 4, a graph showing three exemplary "horizons", the center one of which is centered on a nominal horizon line (shown at reference numeral 16) in the vertical center of the image frame.

Figure 5:
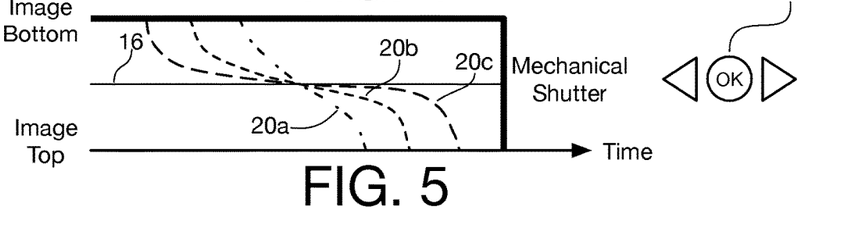
FIG. 5 is a graph illustrating exemplary control of the filter density strength of a graduated optical density filter in accordance with the present invention.

Similarly, the filter strength (optical density) of the filter can be adjusted by using the "left" and "right" buttons 18 on the back of the camera as illustrated in FIG. 5, a graph showing three different exemplary filter gradient curves 20a, 20b, and 20c for a single horizon setting. Persons of ordinary skill in the art will easily be able to implement such control functions in a digital camera using these or other control buttons or surfaces on the camera.

The filter adjustments can be seen in an electronic viewfinder (LCD screen) of the digital camera, allowing the user to preview the effects and make fine adjustments if desired.

Figure 6:
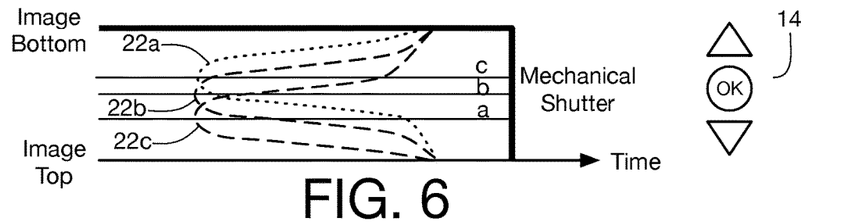
FIG. 6 is a graph illustrating exemplary control of the vertical location of the lowest filter density strength position of a non-linear neutral density filter having a density that is a non-monotonic function of vertical (or horizontal) position in an image frame.

In accordance with the present invention, an optical density filter having a density that is a non-monotonic function of vertical (or horizontal) position in an image frame may be realized. FIG. 6 is a graph illustrating exemplary control of the vertical location of the lowest filter density strength position of a non-linear neutral density filter having a density that is a non-monotonic function of vertical (or horizontal) position in an image frame.

A filter having the characteristics shown in FIG. 6 may be useful to capture images where the composition includes, for example, a bottom ground portion, a central sky portion having a brightness higher than the bottom ground portion, and an upper cloud portion having a brightness lower than the central sky portion, or a composition including a patch of sky between high-rise buildings. Other examples will readily suggest themselves to photographers.

The vertical portion of the image where the lowest density portion of the filter is centered may be adjusted using the 4-way controller buttons located on the back of most digital cameras. As non-limiting examples, the vertical position of the lowest density portion of the electronic filter can be adjusted by using the "up" and "down" buttons 14 on the back of the camera as illustrated at reference numerals 22*a*, 22*b*, and 22*c* in FIG. 6, that shows the vertical position of three exemplary "horizons" a, b, and c, the center one of which (b) is centered on a nominal horizon line (shown at reference numeral 16) in the vertical center of the image frame.

Figure 7:
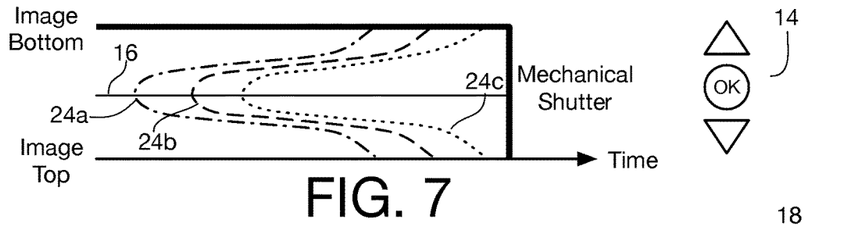
FIG. 7 is a graph illustrating exemplary control of the density of a graduated optical density filter having a density that is a non-monotonic function of vertical (or horizontal) frame position in accordance with the present invention.
Figure 8:
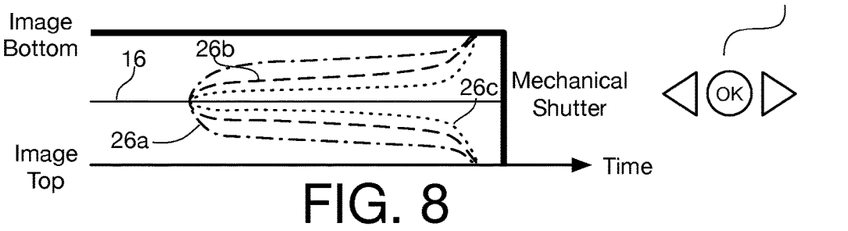
FIG. 8 is a graph illustrating exemplary control of the width of a center minimum-density region of a graduated optical density filter having a density that is a non-monotonic function of vertical (or horizontal) frame position in accordance with the present invention.

Similarly, the filter strength (optical density) of the filter can be adjusted by using the "left" and "right" buttons 18 on the back of the camera as illustrated in FIG. 7, a graph showing three different exemplary filter gradient curves 24*a*, 24*b*, and 24*c* for a single horizon setting. Persons of ordinary skill in the art will easily be able to implement such control functions in a digital camera using these or other control buttons or surfaces on the camera. The width of the lowest density portion of the filter can also be adjusted as shown in the graph of FIG. 8, where the widest setting is represented by filter gradient curve 26*a*, a wider filter gradient curve 26*b*, and the widest filter gradient curve 26*c*. The function button(s) on a digital camera can be used to define the functions of the up, down left and right buttons as is well known in the art.

Persons of ordinary skill in the art will recognize that filters implementing other non-monotonic functions may be realized according to the present invention.

With respect to digital camera image sensors that implement the reset function as a row reset function, persons of ordinary skill in the art will appreciate that there is a fundamental limitation to this technique in that the filter only works when the camera is held in "landscape" mode. This covers most landscape photos, and fits well with the main application for high-resolution digital cameras. Image sensors that independently control row and column reset functions can be configured to allow operation in either portrait or landscape mode.

According to another aspect of the present invention, an independent color channel graduated density filter allows the optical density of individual color pixel sensors in an imaging array to be controlled independently. The present invention is particularly suited for imaging arrays having vertical color pixel sensors such as those manufactured by Foveon, Inc., the assignee of the present invention, although the operation of the present invention is not limited to such sensors.

The ability to independently control the optical density filters in the separate colors of a multi color sensor with the horizon set at an arbitrary position, such as, but not limited to, the bottom of the image frame allows different artistic effects to be implemented.

Since the shutter speed varies, it is particularly advantageous to use the maximum exposure time to calculate it. Then the filter strength may be adjusted in accordance with the principles of the present invention.

Since the shutter speed varies across the frame in image sensors employing the present invention, motion artifacts may occur if the exposure time is short and high filter strength is used. In typical landscape shots this should not cause a problem. In fact, it can be beneficial. One of the difficult challenges is to properly expose for the foreground when there is motion in the sky, such as birds flying or clouds moving rapidly. In high dynamic range (HDR) photography, done with exposure bracketing, this results in streaking, double images, etc. The electronic neutral density filter of the present invention will help to freeze motion in such cases and will also help minimize the effect of artifacts such as leaves moving in the breeze, another difficult case for HDR techniques. In addition, persons of ordinary skill in the art will appreciate that such motion artifacts may be deliberately exploited for producing various artistic effects.

Figure 9A:
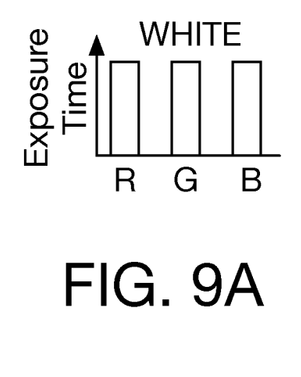
FIGS. 9A through 9G are diagrams showing how individual color filters can be applied in a color imager having separate row reset control over red, green, and blue pixels in individual rows of the imager.
Figure 9B:
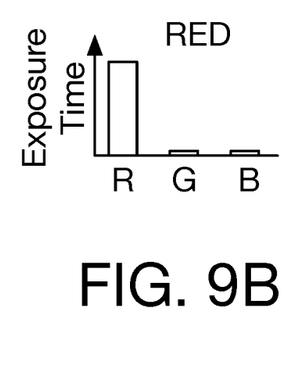
Figure 9C:
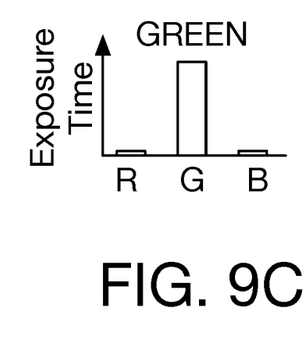
Figure 9D:
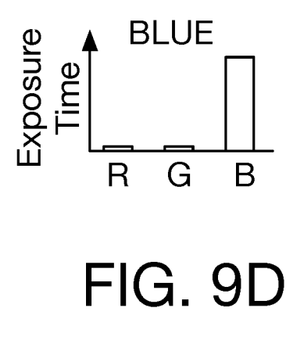
Figure 9E:
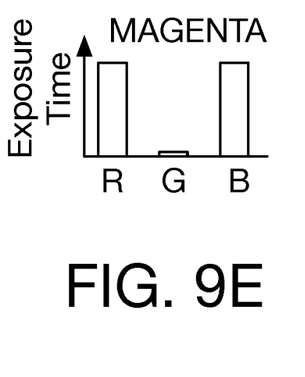
Figure 9F:
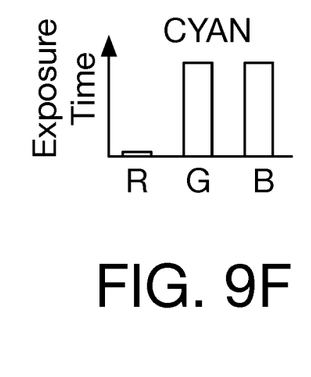
Figure 9G:
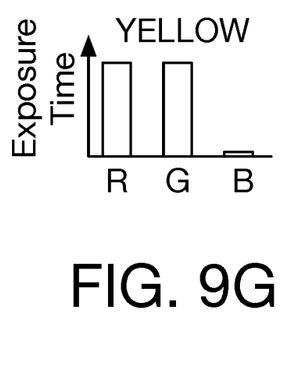

According to one aspect of the present invention illustrated in FIGS. 9A through 9G, by using the electronic density filter technique independently for different color channels in accordance with the present invention, graduated filters of any color can be created. FIG. 9A shows an example of a full-spectrum (white) filter; FIG. 9B shows an example of a red filter; FIG. 9C shows an example of a green filter; FIG. 9D shows an example of a blue filter; FIG. 9E shows an example of a magenta filter; FIG. 9F shows an example of a cyan filter; and FIG. 9G shows an example of a yellow filter.

As seen in FIGS. 9A through 9G, the filter can be graded between neutral (by controlling the three colors by an equal amount) and any color or combination of colors. Persons of ordinary skill in the art will readily appreciate that the examples shown in FIGS. 9A through 9G are illustrative only and that the exposure time of each of the individual RGB filters is separately and potentially infinitely variable between zero and a maximum exposure time.

The independent color channel density filter of the present invention can also be used to create gradation in hue across the electronic filter. As a non-limiting example, in black and white photography the sky above the horizon line could be darkened using yellow filtration while blue flowers below the horizon line are lightened with blue filtration.

It is possible to make such filters for sensors with a color filter array, such as a Bayer pattern filter. In a Bayer pattern filter, each row of the array needs to have two row reset control lines. Alternate rows of the array need to have separate control over reset of green and red pixels and green and blue pixels.

As long as only neutral density filters are used, vertical color sensors such as the X3 sensor designed by Foveon of Santa Clara, Calif. does not offer any advantages over CFA sensors.

When colored filters are used in imagers having separate control over row reset of red, green, and blue, pixels, CFA sensors will suffer a loss of resolution. Vertical color sensors such as the X3 sensor require a minimum area to create three independent R, G, B values. Sensors such as the X3 sensor require only $\frac{1}{3}^{th}$ the area required by a Bayer pattern CFA sensor, since all colors are arranged vertically and are independently controllable. In addition vertical color sensors do not suffer any loss of resolution, and will therefore produce higher-quality images.

Figure 10:
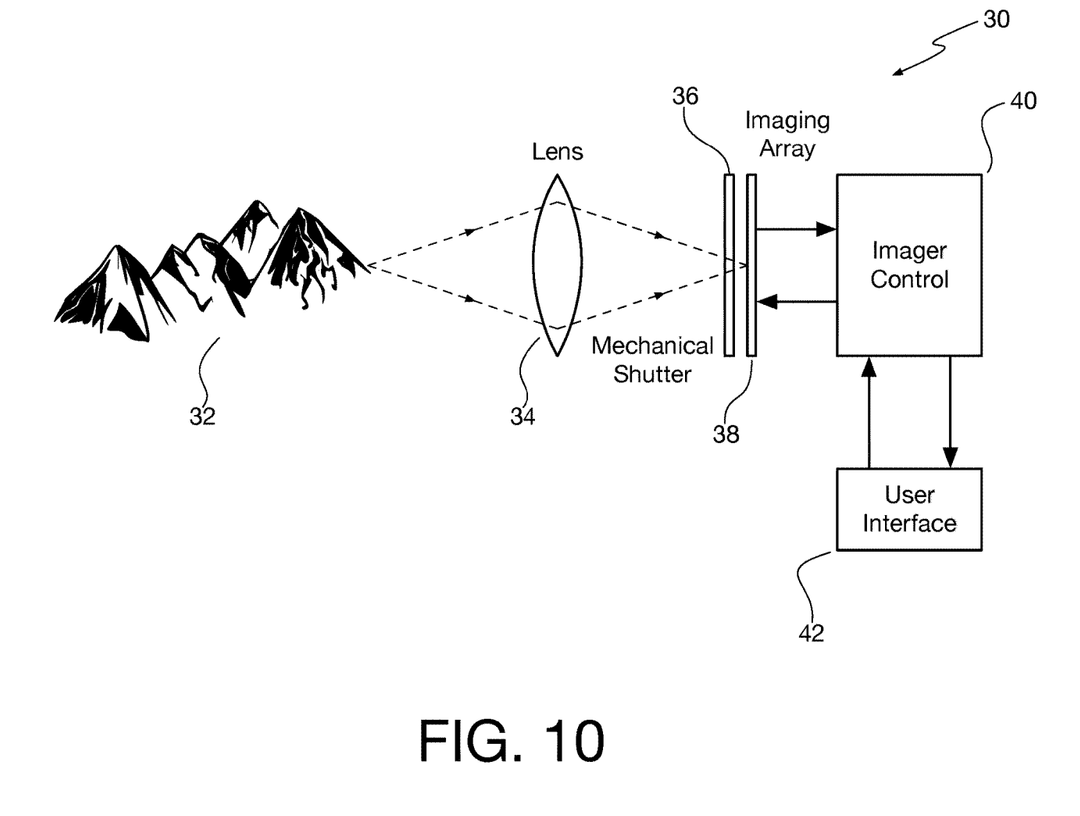
FIG. 10 is a diagram of a digital camera employing a mechanical shutter that can employ electronic neutral density filters in accordance with the present invention.

Referring now to FIG. 10, a diagram shows an illustrative digital camera 30 in which the present invention may be implemented. A scene 32 is focused by lens 34 through mechanical shutter 36 onto imaging array 38. Control circuits 40 are usually disposed on the imaging array itself. Control circuits 40 include exposure and readout controls for operating the rows and columns of the pixels in the array as is known in the art. A user may interact with and control camera 30 through user interface 42.

Figure 11:
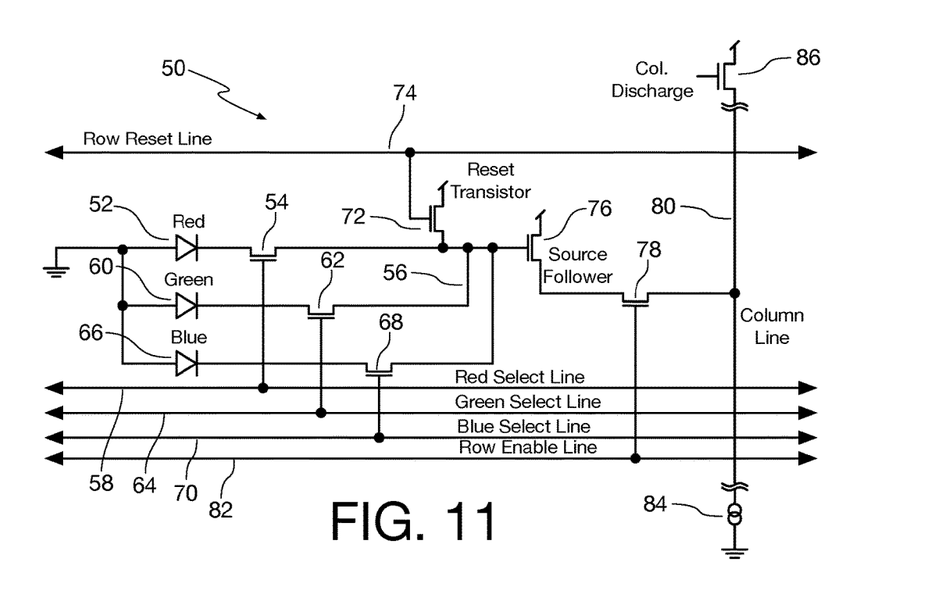
FIG. 11 is a schematic diagram of an illustrative photodiode pixel sensor that can be operated to implement an electronic neutral density filters in accordance with the present invention.
Figure 12:
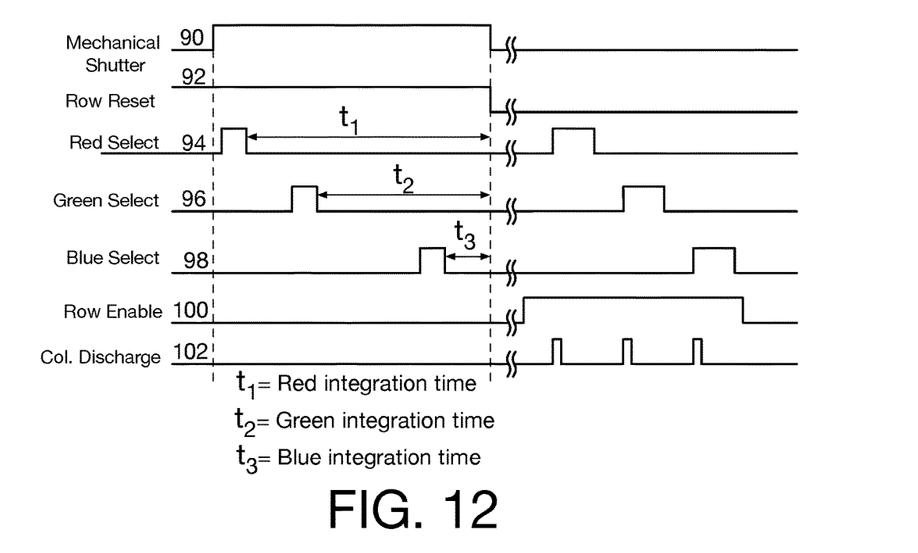
FIG. 12 is a timing diagram block diagram illustrating a method of operating the photodiode pixel sensor of an image sensor of FIG. 8 to implement an electronic neutral density filters in accordance with the present invention.

Referring now to FIG. 11 and FIG. 12, an aspect of the invention will be described with reference to a three-color pixel sensor. Persons of ordinary skill in the art will appreciate that the operation of a monochromatic pixel sensor in accordance with the present invention is understood by considering a single one of a plurality of possible colors. FIG. 11 is a schematic diagram of an illustrative three-color pixel sensor 50 that can be used to implement the present invention. Exemplary colors red, green, and blue are used to disclose this aspect of the invention but persons of ordinary skill in the art will appreciate that the present invention is not limited to the use of these particular colors. Each pixel sensor in an array of pixel sensors is disposed at a row position and a column position in the array. Pixel sensor 50 is one of a plurality of pixel sensors disposed in a row of the array at a particular column position.

Red photodiode 52 is coupled through red-select transistor 54 to a floating node 56. Red-select transistor 54 has its gate driven by red-select line 58. There is one red-select line for every row in the array.

Green photodiode 60 is coupled through green-select transistor 62 to the floating node 56. Green—select transistor 62 has its gate driven by green-select line 64. There is one green-select line for every row in the array.

Blue photodiode 66 is coupled through blue-select transistor 68 to the floating node 56. Blue-select transistor 68 has its gate driven by blue-select line 70. There is one blue-select line for every row in the array.

Floating node 56 is coupled to a reset potential through reset transistor 72. The reset transistor 72 has its gate driven by row-reset line 70. There is one row-reset line for every row in the array.

The floating node 56 is coupled through a source-follower transistor 76 and a row-select transistor 78 to a column line 80 for reading out the charge accumulated by the photodiodes 52, 60, and 66. The row-select transistor 78 has its gate driven by a row-enable line 82. The column line 80 may be driven by a current source 84 as is known in the art. The column line 80 is discharged to a column discharge potential at selected times by applying a column discharge potential to the gate of column discharge source-follower transistor 86.

FIG. 12 is a timing diagram that illustrates the timing signals applied to the pixel sensor 50 to implement the electronic neutral density filter in accordance to one aspect of the present invention. FIG. 12 shows the various signals that can be applied to the control lines of the pixel sensor 50 to implement a method in accordance with the present invention.

Exposing an image is controlled in part by the mechanical shutter of the camera (reference numeral 36 in FIG. 10). The opening and closing of the mechanical shutter is depicted by the first trace 90 in the timing diagram of FIG. 12.

The second trace 92 of FIG. 12 represents the signal applied to the row-reset line 74 of FIG. 11. In the normal operation of a pixel sensor of the type depicted in FIG. 11, each pixel is reset by simultaneously turning on its associated select transistor and the reset transistor. After the associated select transistor has been turned off, charge is allowed to accumulate on the photodiode until the mechanical shutter closes, blocking any additional light from reaching the imaging array. The accumulated charge is read out after discharging the column line at a time dependent on the length of the exposure required for the ambient light level of the subject. As will be appreciated by persons of ordinary skill in the art, the dark level of the pixel sensor will also be read out at some point during the read out process. In normal operation, the timing of signals to reset and read each pixel sensor 50 is selected to assure that each color is exposed for the same amount of time.

In accordance with the present invention, the timing of the control signals applied to the pixel sensor 50 is altered to implement the electronic neutral density filter in accordance with the present invention. In the illustrative example of FIG. 9, the timing of the signals shown is selected to produce an integration time $t_1$ for the red photodiode 52, an integration time $t_2$ for the green photodiode 60, and an integration time $t_3$ for the blue photodiode 66, where $t_1 > t_2 > t_3$. Persons of ordinary skill in the art will appreciate that because the reset, red-select, green-select, and blue-select signals are row-wise or blade-wise signals, all pixel sensors in a row (or group of adjacent rows constituting a blade), the operations described herein will occur in all pixel sensors 50 in the selected row or blade.

As may be seen from an examination of FIG. 12, the row-reset signal 92 is asserted prior to the opening of the mechanical shutter 90. The red-select transistor 54 is turned on by the red-select signal 94 asserted on red-select line 58. When both the red-select transistor 54 and the reset transistor 72 are turned on, the red photodiode 52 in the pixel sensor 50 is held at a reset potential.

The red-select signal 94 is de-asserted at a time selected to produce an integration time $t_1$ for the red photodiode 52 in the pixel sensor 50. The integration time $t_1$ ends when the mechanical shutter closes, blocking any additional light from reaching the pixel sensor 50 in the imaging array.

The green-select transistor 62 is turned on by the green-select signal 96 asserted on green-select line 64. When both the green-select transistor 54 and the reset transistor 72 are turned on, the green photodiode 60 in the pixel sensor 50 is held at the reset potential.

The green-select signal 96 is de-asserted at a time selected to produce an integration time $t_2$ for the green photodiode 60 in the pixel sensor 50. The integration time $t_1$ ends when the mechanical shutter closes, blocking any additional light from reaching the pixel sensor 50 in the imaging array.

The blue-select transistor 68 is turned on by the blue-select signal 98 asserted on blue-select line 70. When both the blue-select transistor 68 and the reset transistor 72 are turned on, the blue photodiode 66 in the pixel sensor 50 is held at a reset potential.

The blue-select signal 98 is de-asserted at a time selected to produce an integration time $t_3$ for the blue photodiode 66 in the pixel sensor 50. The integration time $t_3$ ends when the mechanical shutter closes, blocking any additional light from reaching the pixel sensor 50 in the imaging array.

The closing of the mechanical shutter stops the integration of photocharge on the red, green, and blue photodiodes 52, 60, and 66. This allows the readout of the accumulated photocharge from the red, green, and blue photodiodes 52, 60, and 66 to be completely decoupled from the reset timing of the red, green, and blue photodiodes 52, 60, and 66 in pixel sensor 50. Readout is shown using the different color select signals 94, 96, and 98, while row select signal 100 is high. The columns are discharged before each color read as shown at reference numeral 102.

Persons of ordinary skill in the art will observe that it is not required for the row-reset signal 92 to be on during the entire time that the mechanical shutter is held open. It is only necessary to assert the row-reset signal during the times that the red-select, green-select, and blue-select signals 94, 96, and 98 are asserted while the mechanical shutter is open. Such skilled persons will also appreciate that, as shown in FIG. 12, the longest integration time $t_1$ that starts at the falling edge of the red-select signal 94 can be set to commence after the mechanical shutter has completely opened, eliminating any timing variance in the mechanical shutter opening from affecting the integration time. Persons skilled in the art will appreciate that this particular mode of operation may be limited at extremely fast exposure times.

As previously noted, one advantageous aspect of the present invention is that the readout of the accumulated photocharge from the red, green, and blue photodiodes 52, 60, and 66 is completely decoupled from the reset timing of the red, green, and blue photodiodes 52, 60, and 66 in pixel sensor 50, subject only to limitations imposed by any parasitic charge leakage. For the particular pixel sensor 50 depicted in FIG. 8, readout of each color is accomplished by first discharging the column line by asserting a signal to the gate of column discharge transistor 86 and then asserting one of the color select signals 94, 96, or 98.

Figure 13:
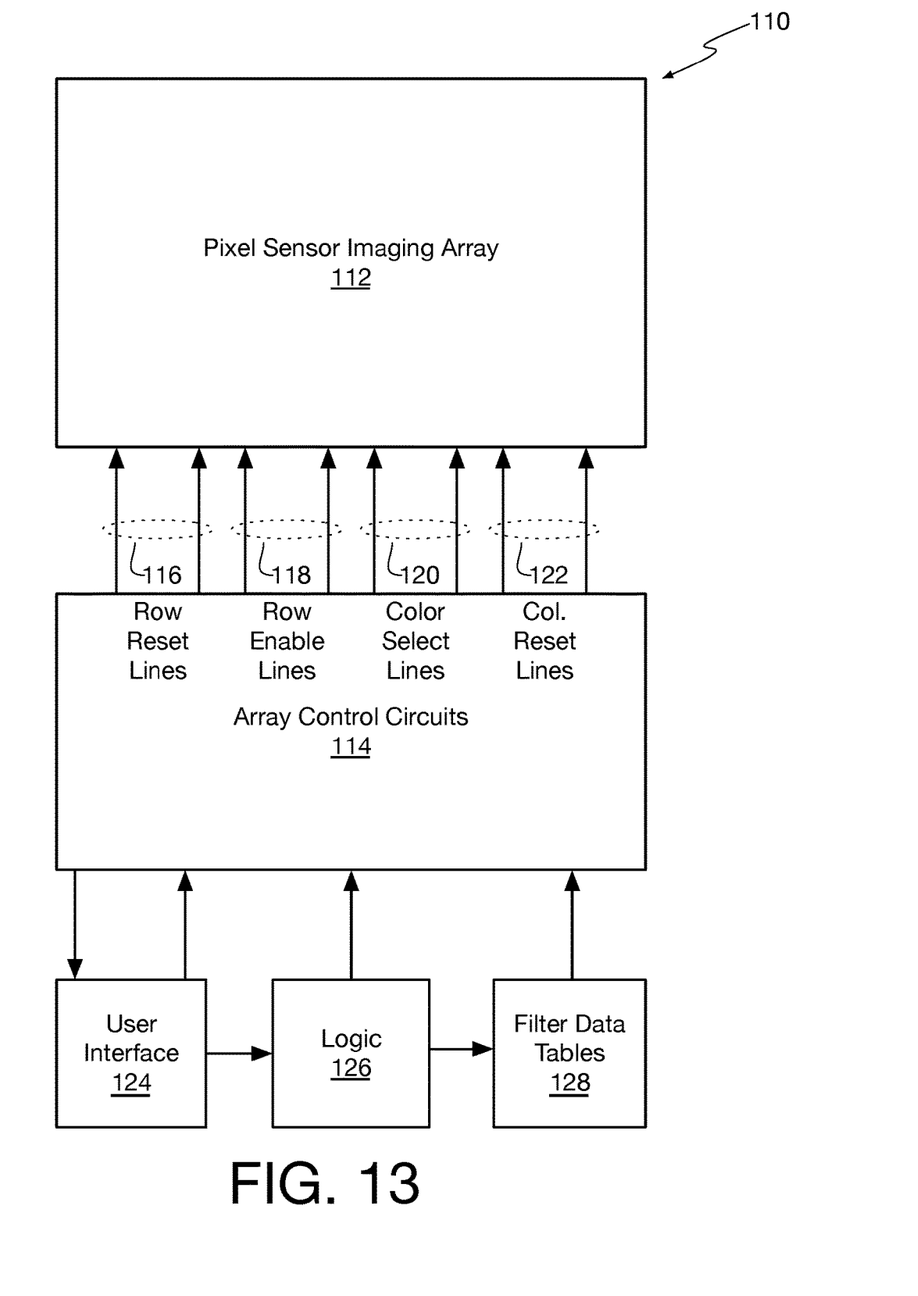
FIG. 13 is a block diagram illustrating an exemplary architecture for implementing an electronic graduated neutral density filter in a digital camera in accordance with the present invention.

Referring now to FIG. 13, a block diagram illustrates an exemplary architecture for implementing an electronic graduated neutral density filter in a digital camera in accordance with the present invention. The imaging circuitry 110 includes an imaging array 112 containing an array of rows and columns of pixel sensors such as the pixel sensor depicted in FIG. 11. Imaging array 112 is controlled by array control circuits 114 that supply the signals to drive row-reset lines 116, row-enable lines 118, color-select lines 120, and column-reset lines 122. Persons of ordinary skill in the art will appreciate that in imaging arrays where the source-follower transistors are not shared, the color select lines 120 are not necessary.

A user interface 124 accepts input from a user to control the camera as is well understood in the art. In addition to customary user input, the user can control operation of the electronic neutral density filter of the present invention. User commands are sent from the user interface 124 to the array control circuits 114 and to logic 126. The function of logic 126 is to direct the operation of the array control circuits 114 as is known in the art and to also direct the operation of the electronic neutral density filter by writing the appropriate data to filter data tables 128 to control the timing of the signals driving row-reset lines 116, row-enable lines 118, color-select lines 120, and column-reset lines 122. The filter data tables 128 implement the user-selected filter strength and horizon location selections shown, for example, in FIGS. 4 and 5. Persons of ordinary skill in the art will readily observe that the number of filter data tables 128 will correlate with the number of colors to be implemented in the electronic neutral density filter being implemented. Such skilled persons will also appreciate that mathematical operations such as polynomial or other arithmetic functions may be used to implement the same function as the tables.

Figure 14:
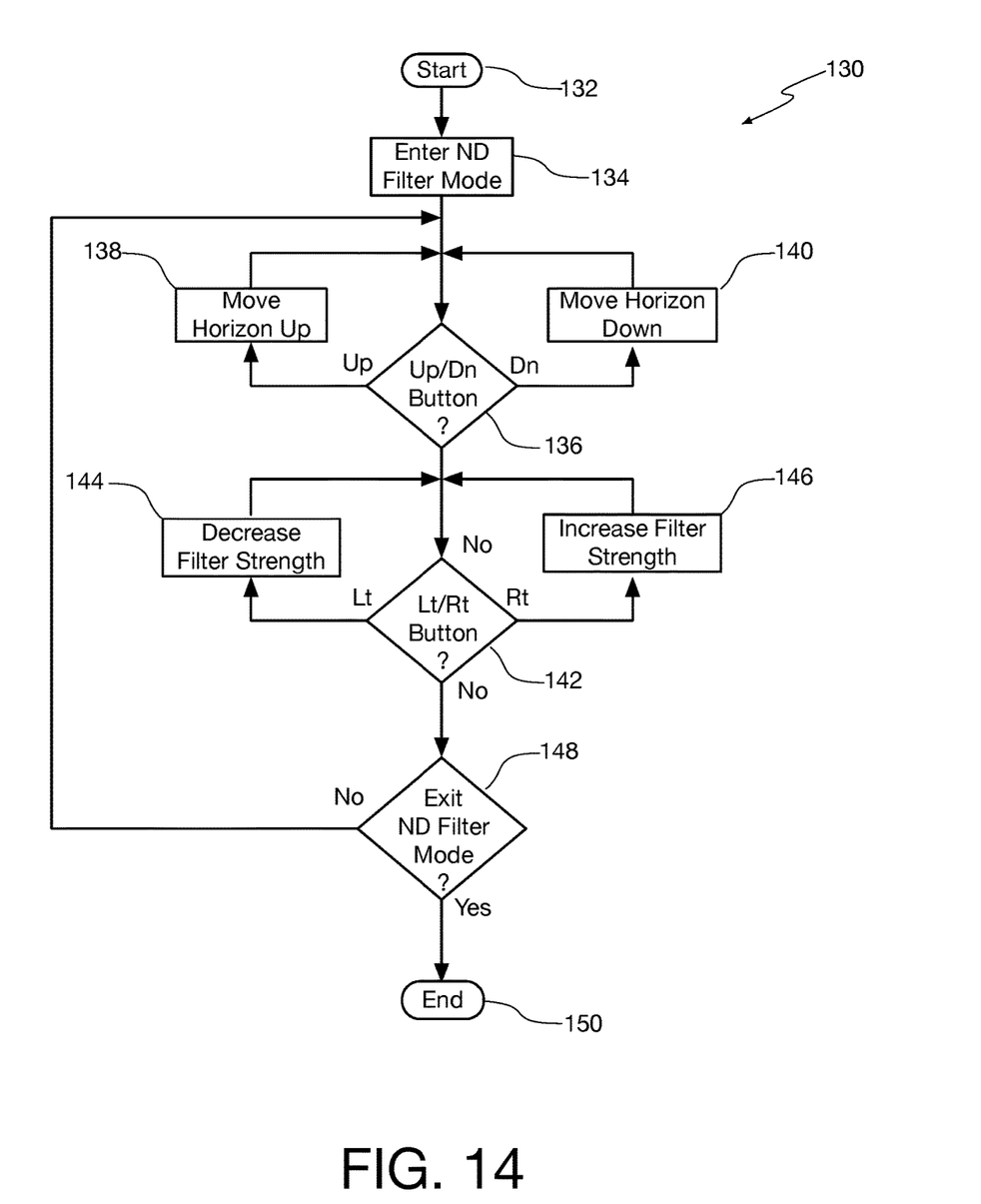
FIG. 14 is a flow diagram illustrating an exemplary way to control an electronic graduated neutral density filter in in a digital camera in accordance with the present invention.

Referring now to FIG. 14, a flow diagram illustrates an exemplary method 130 that may be used to control an electronic graduated neutral density filter in in a digital camera in accordance with the present invention.

The method starts at reference numeral 132. At reference numeral 134 the camera enters neutral density filter mode, typically by selecting that mode from the choices a camera menu. Implementation of camera menus is well known in the art. At reference numeral 136, it is determined whether the up or down button of the camera is activated. If the up button is activated, the process proceeds to reference numeral 138, where the horizon position is moved up. If the down button is activated, the process proceeds to reference numeral 140, where the horizon position is moved down. If neither the up nor down buttons are activated, the process proceeds to reference numeral 142, where it is determined whether the left or right button of the camera is activated. If the left button is activated, the process proceeds to reference numeral 144, where the filter strength is decreased. If the right button is activated, the process proceeds to reference numeral 146, where the filter strength is increased. Persons of ordinary skill in the art will appreciate that the order of sensing the up/down buttons and left/right buttons is arbitrary and either pair of buttons can be sensed before the other. Such skilled persons will also appreciate that the assignment of the button functions is also somewhat arbitrary and that the exact response of the method to the user input will depend on the action desired, such as incremental or scrolling actions.

If neither the left or right buttons are activated, the process proceeds to reference numeral 148, where it is determined if a command to exit the filter mode has been asserted. If the command to exit the filter mode has been asserted, the process ends at reference numeral 150. If the command to exit the filter mode has not been asserted, the process returns to reference numeral 136 and the polling of the up/down and left/right buttons resumes.

In accordance with other aspects of the present invention, it is also possible, with several live view frames, to implement a feedback loop to automatically adjust the filter's position and strength. Implementation of such a feedback loop will provide a good default filter; the user can then "tweak" it from that position if needed. Implementation of an exemplary one of such feedback loops is show in FIG. 15.

Figure 15:
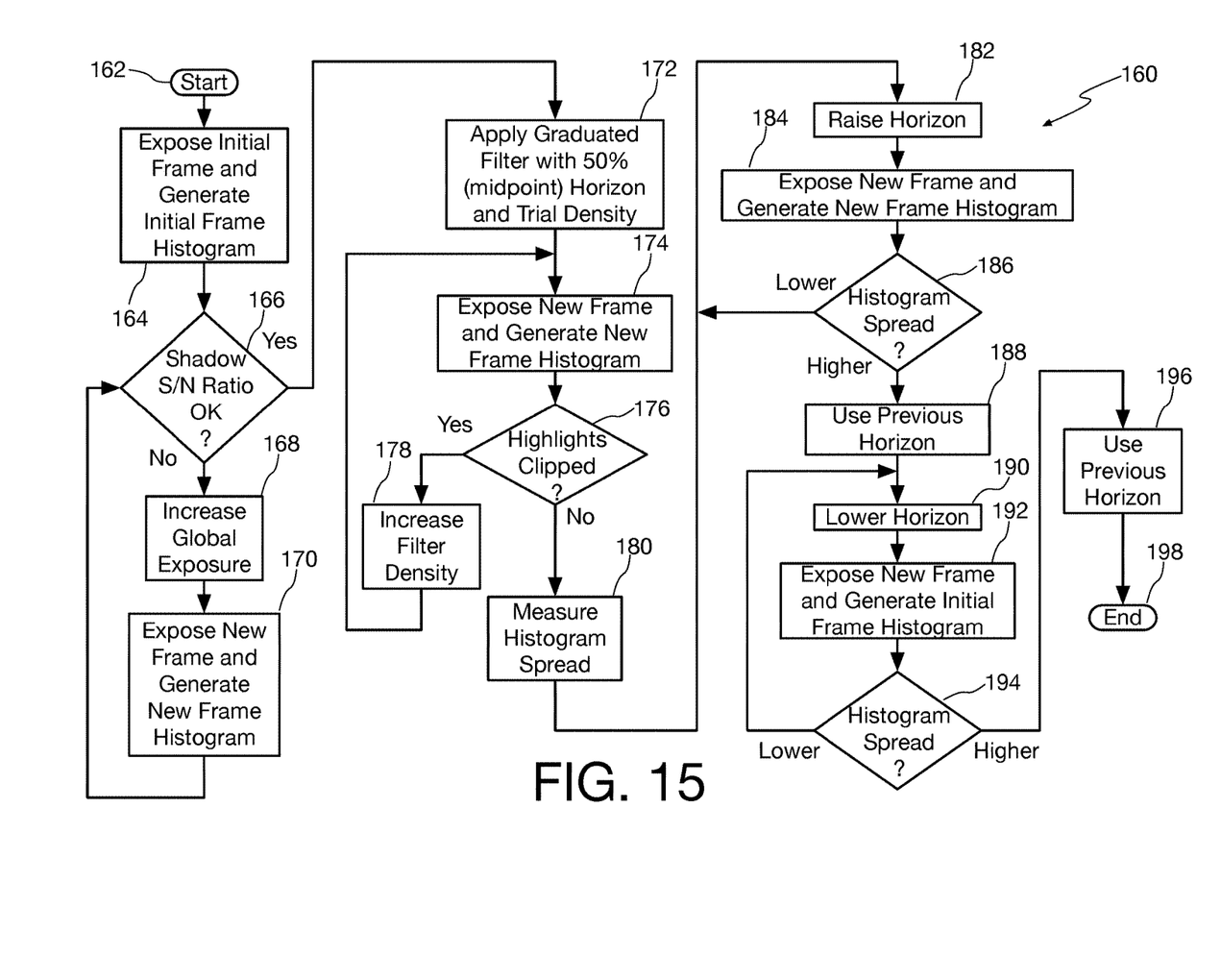
FIG. 15 is a flow diagram illustrating an exemplary way to implement a feedback loop to automatically adjust the filter's position and strength in accordance with the present invention.

Referring now to FIG. 15, a flow diagram illustrates an exemplary method 160 for implementing a feedback loop to automatically adjust the filter's position and strength in accordance with the present invention. The method begins at reference numeral 162.

At reference numeral 164 an initial frame (e.g., a live view frame) is exposed and an initial frame histogram is generated. At reference numeral 166 it is determined whether the shadow signal-to-noise ratio is sufficient. This ratio will vary in individual cases as is known in the art and can be selected for an individual camera model.

If the shadow signal-to-noise ratio is not sufficient, the process proceeds to reference numeral 168 where the global exposure of the camera is increased. At reference numeral 170 a new frame is exposed and new histogram is generated from the new frame. The process then returns to reference numeral 166 where it is it is determined whether the shadow signal-to-noise ratio is sufficient. This loop is repeated until it is determined that the shadow signal-to-noise ratio is sufficient.

If at reference numeral 166, it was determined that the shadow signal-to-noise ratio is sufficient, the process proceeds to reference numeral 172, where a graduated neutral density filter having a nominal 50% horizon position and a trial density level is applied. At reference numeral 174 a new frame is exposed and a new histogram is generated from the new frame. At reference numeral 176 it is determined whether any highlights of the image are clipped. If any highlights of the image are clipped, the process proceeds to reference numeral 178, where the filter density is increased. The process then returns to reference numeral 174 where a new frame is exposed and a new histogram is generated from the new frame. At reference numeral 176 it is again determined whether any highlights of the image are clipped. This loop is repeated until it is determined that no highlights of the image are clipped.

If it is determined at reference numeral 176 that no image highlights are clipped, the process proceeds to reference numeral 180 where the histogram spread of the current image is measured. Next, at reference numeral 182, the horizon point of the filter is raised and at reference numeral 184 a new frame is exposed and a new histogram is generated from the new frame. At reference numeral 186 the histogram spread of the current image exposed at reference numeral 184 is compared with the histogram spread of the previous image that was determined at reference numeral 180. If the histogram spread of the current image exposed at reference numeral 184 is lower than the histogram spread of the previous image that was determined at reference numeral 180, the process returns to reference numeral 182, where the horizon point of the filter is raised. The method loops through reference numerals 182, 184, and 186 until the histogram spread of the current image is higher than that of the previous image. At that point the process proceeds to reference numeral 188, where the previous horizon level is restored.

The process then proceeds to reference numeral 190, where the horizon point of the filter is lowered. At reference numeral 192 a new frame is exposed and a new histogram is generated from the new frame. At reference numeral 194 the histogram spread of the current image exposed at reference numeral 192 is compared with the histogram spread of the previous image. If the histogram spread of the current image exposed at reference numeral 184 is lower than the histogram spread of the previous image that was determined at reference numeral 180, the process returns to reference numeral 190, where the horizon point of the filter is lowered. The method loops through reference numerals 190, 192, and 194 until the histogram spread of the current image is higher than that of the image exposed using the horizon of reference numeral 188. At that point the process proceeds to reference numeral 196, where the previous horizon level is restored. The method ends at reference numeral 198.

Persons of ordinary skill in the art will appreciate that the shifting of the horizon point may alter the shadow signal-to-noise ratio, which may be re-calibrated at this point as shown at reference numerals 166, 168, and 170. The image may also be re-examined and corrections made for any clipped highlights as shown in the loop including reference numerals 176 and 178 and 174.

Persons of ordinary skill in the art will observe that the techniques of the present invention can be used to make a "flat" exposure (an exposure made with the camera fstop range set to 0, making the exposure the same across the entire imager). Flat exposures may be created by programming the reset turnoff to lead the shutter turnoff by the same time at each row as the shutter blade turnoff crosses the imager. Persons of ordinary skill in the art will appreciate that a typical focal plane shutter changes speed considerably across the imager, so it is necessary to generate a nonlinear curve of reset travel characteristic of the shutter in order to provide the shutter turnoff time for each row. Using this technique may allow cheaper or shorter exposure focal plane shutters to be used.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a digital camera having an imaging array including a plurality of pixels arranged in rows and columns, the digital camera further having a mechanical shutter having an open position allowing light to illuminate the imaging array and a closed position blocking light from illuminating the imaging array, a method for performing neutral density filtering of images captured by the imaging array, the method comprising:
    opening the mechanical shutter;
    operating each row in the array by:
        resetting all of the pixel sensors in the row by asserting a row reset signal and then asserting a pixel-select signal for all of the pixel sensors in the row at a time after the mechanical shutter is opened;
        starting exposure for all of the pixel sensors in the row at a row exposure start time by then de-asserting the pixel-select signal for all of the pixel sensors in the row, the row exposure start time for each row in the array being a function of a density filter function applied to an image to be captured by the array;
    ending the exposure for all of the pixel sensors in the row by closing the mechanical shutter; and
    reading pixel values from the plurality of pixels in the pixel array by again asserting the pixel-select signal for all of the pixel sensors in the row at a read time after the mechanical shutter has closed, the read time being unrelated to the row-exposure start time.

2. The method of claim 1, wherein the row exposure start time is the same for n rows in the array, where n is an integer greater than 1.

3. The method of claim 1, wherein the row exposure start time is the same for n successive rows in the array, where n is an integer greater than 1.

4. The method of claim 1 wherein each row in the array is operated sequentially from the first row in the array to the last row in the array.

5. The method of claim 1 wherein the neutral density-filter function is a monotonic function.

6. The method of claim 1 wherein the neutral density filter function is a non-monotonic function.

7. In a digital camera having an imaging array including a plurality of pixels arranged in rows and columns, the digital camera further having a mechanical shutter having an open position allowing light to illuminate the imaging array and a closed position blocking light from illuminating the imaging array, a method for performing neutral density filtering of images captured by the imaging array, the method comprising:
    opening the mechanical shutter;
    operating each row in the array by:
        applying a reset potential to all of the pixel sensors in the row;
        starting exposure for each of the pixel sensors in the row at a row exposure start time by removing the reset potential from each pixel sensor in the row, the row exposure start time for each row in the array being a function of a density filter function applied to an image to be captured by the array;
    closing the mechanical shutter;
    reading pixel values from the plurality of pixels in the pixel array at a time after the mechanical shutter has closed, the time for reading each pixel being unrelated to a time at which the exposure for each of the pixel sensors in the row was started; and
    wherein for each row a time interval between removing the reset potential from each pixel sensor in the row and closing the mechanical shutter for the row is a function of a neutral-density-filter function applied to images captured by the imaging array.

8. The method of claim 7, wherein the row exposure start time is the same for n rows in the array, where n is an integer greater than 1.

9. The method of claim 7, wherein the row exposure start time is the same for n successive rows in the array, where n is an integer greater than 1.

10. The method of claim 7, wherein each row in the array is operated sequentially from the first row in the array to the last row in the array.

11. The method of claim 7, wherein the neutral density filter function is a monotonic function.

12. The method of claim 7, wherein the neutral density filter function is a non-monotonic function.

* * * * *